US012488382B2

(12) United States Patent
Waese

(10) Patent No.: US 12,488,382 B2
(45) Date of Patent: Dec. 2, 2025

(54) LIVE VIEW OF A WEBSITE SUCH AS AN E-COMMERCE STORE

(71) Applicant: Shopify Inc., Ottawa (CA)

(72) Inventor: Jamie Waese, Toronto (CA)

(73) Assignee: Shopify, Inc., Ottawa (CA)

( * ) Notice: Subject to any disclaimer, the term of this patent is extended or adjusted under 35 U.S.C. 154(b) by 280 days.

(21) Appl. No.: 17/821,974

(22) Filed: Aug. 24, 2022

(65) Prior Publication Data

US 2024/0070761 A1 Feb. 29, 2024

(51) Int. Cl.
*G06Q 30/00* (2023.01)
*G06F 16/954* (2019.01)
*G06Q 30/0601* (2023.01)

(52) U.S. Cl.
CPC ....... *G06Q 30/0641* (2013.01); *G06F 16/954* (2019.01); *G06Q 30/0633* (2013.01)

(58) Field of Classification Search
CPC ............ G06Q 30/0641; G06Q 30/0633; G06F 16/954
USPC ...................................................... 705/26, 27
See application file for complete search history.

(56) References Cited

U.S. PATENT DOCUMENTS

| | | | |
|---|---|---|---|
| 9,250,759 B1 * | 2/2016 | Commons .......... | G06Q 30/0601 |
| 2003/0154442 A1 * | 8/2003 | Papierniak ............ | G06F 16/958 |
| | | | 707/E17.116 |
| 2012/0296682 A1 * | 11/2012 | Kumar ................... | G06Q 10/00 |
| | | | 705/7.11 |
| 2012/0316902 A1 * | 12/2012 | Kumar ................... | G06Q 30/00 |
| | | | 705/7.11 |
| 2013/0018713 A1 * | 1/2013 | Kumar ............... | G06Q 30/0201 |
| | | | 705/26.1 |
| 2014/0297362 A1 * | 10/2014 | Kumar ............... | G06Q 30/0253 |
| | | | 705/7.29 |
| 2015/0205449 A1 * | 7/2015 | Sinha .................... | H04L 67/535 |
| | | | 715/738 |
| 2018/0011622 A1 * | 1/2018 | Saragossi ............. | G06F 40/143 |

OTHER PUBLICATIONS

Gittens, "Live View: Watch Visitors Become Customers with Real-Time Reporting," Google.com; Nov. 26, 2020 'https://www.shopify.com/blog/live-view' (Year: 2020).*

* cited by examiner

*Primary Examiner* — Robert M Pond
(74) *Attorney, Agent, or Firm* — Withrow & Terranova, PLLC

(57) ABSTRACT

Systems and methods are disclosed for providing a live view of a website such as an e-commerce store. In one embodiment, a computer-implemented method comprises generating a Graphical User Interface (GUI) representative of webpages of a website and obtaining data indicative of user interactions with the webpages of the website. The method further comprises, based on the data, dynamically updating one or more user interface elements within the GUI to represent presence of one or more users on the webpages within the website and one or more user interactions of the one or more users with the webpages of the website.

20 Claims, 20 Drawing Sheets

FIG. 8

LIVE VIEW OF A WEBSITE SUCH AS AN E-COMMERCE STORE

TECHNICAL FIELD

The present disclosure relates to generation and dynamic updating of a Graphical User Interface (GUI) representative of a live view of a website such as, e.g., an e-commerce store.

BACKGROUND

E-commerce stores have existed for many years. However, in recent years, the number of e-commerce stores has exploded due to many factors including the advent of e-commerce store hosting platforms that enable both individuals and business entities to create their own e-commerce stores quickly and easily. While e-commerce stores provide many advantages and opportunities over conventional brick-and-mortar stores, they also create new challenges.

SUMMARY

Systems and methods are disclosed for providing a live view of a website such as an e-commerce store. In one embodiment, a computer-implemented method comprises generating a Graphical User Interface (GUI) representative of webpages of a website and obtaining data indicative of user interactions with the webpages of the website. The method further comprises, based on the data, dynamically updating one or more user interface elements within the GUI to represent presence of one or more users on the webpages within the website and one or more user interactions of the one or more users with the webpages of the website. Dynamically updating the one or more user interface elements with the GUI comprises dynamically updating one or more user interface elements associated to one or more respective users to reflect presence of the one or more respective users on particular categories of webpages within the website or on particular webpages within the website and dynamically updating the one or more user interface elements associated to the one or more respective users to reflect one or more user interactions of the one or more respective users with the website. In this manner, a GUI representative of a live view of user presence and user interactions with a website is provided.

In one embodiment, the website is an e-commerce store. In one embodiment, the user interactions comprise: a user adding a product to the user's shopping cart, a user removing a product from the user's shopping cart, a user purchasing a product, or any combination thereof. In one embodiment, the webpages of the website comprise a plurality of webpages for a respective plurality of products sold via the e-commerce store.

In one embodiment, the one or more user interface elements associated to the one or more respective users comprise one or more features representative of one or more attributes of the one or more respective users.

In one embodiment, dynamically updating the one or more user interface elements within the GUI further comprises dynamically updating one or more user interface elements representative of a path over which a particular user has navigated through the website.

In one embodiment, dynamically updating the one or more user interface elements within the GUI further comprises dynamically updating at least one of: one or more user interface elements representative of one or more categories of webpages within the website to reflect particular users or a number of users that are present on the one or more categories of webpages within the website or one or more user interface elements representative of one or more webpages within the website to reflect particular users or a number of users that are present on the one or more webpages within the website.

In one embodiment, dynamically updating the one or more user interface elements within the GUI further comprises dynamically updating at least one of: one or more user interface elements representative of one or more categories of webpages within the website to reflect one or more user interactions of one or more users that occur on the one or more categories of webpages within the website or one or more user interface elements representative of one or more webpages within the website to reflect one or more user interactions of one or more users that occur on the one or more webpages within the website.

In one embodiment, dynamically updating the one or more user interface elements associated to the one or more respective users to reflect the one or more user interactions of the one or more respective users with the website comprises, for a particular user interface element associated to a particular user, applying a particular motion or a particular animation to the particular user interface element to reflect occurrence of a particular user interaction.

In one embodiment, the method further comprises receiving, from an operator via an associated operator device, a request for a new view of the website and updating the GUI to present the new view of the website in response to receiving the request. In one embodiment, the new view is a user-specific view in which the GUI presents one or more user interface elements that represent a path of a select user to and through the website. In one embodiment, the website is an e-commerce store and the webpages of the website comprise a plurality of webpages for a respective plurality of products sold via the e-commerce store.

Corresponding embodiments of a computer system are also disclosed. In one embodiment, the computer system comprises a network interface and processing circuitry associated with the network interface, the processing circuitry configured to cause the computer system to generate a GUI representative of webpages of a website and obtain data indicative of user interactions with the webpages of the website. The processing circuitry is further configured to cause the computer system to, based on the data, dynamically update one or more user interface elements within the GUI to represent presence of one or more users on the webpages within the website and one or more user interactions of the one or more users with the webpages of the website. In order to dynamically update the one or more user interface elements with the GUI, the processing circuitry is further configured to cause the computer system to dynamically update one or more user interface elements associated to one or more respective users to reflect presence of the one or more respective users on particular categories of webpages within the website or on particular webpages within the website and dynamically update the one or more user interface elements associated to the one or more respective users to reflect one or more user interactions of the one or more respective users with the website.

Corresponding embodiments of a non-transitory computer readable medium are also disclosed. In one embodiment, a non-transitory computer readable medium is provided, wherein the non-transitory computer readable medium stores instructions executable by processing circuitry of a computer system whereby the computer system is caused to: generate a GUI representative of webpages of a website; obtain data indicative of user interactions with the webpages of the website; and, based on the data, dynamically update one or more user interface elements within the GUI to represent presence of one or more users on the webpages within the website and one or more user interactions of the one or more users with the webpages of the website. In order to dynamically update the one or more user interface elements with the GUI, the processing circuitry is further caused to dynamically update one or more user interface elements associated to one or more respective users to reflect presence of the one or more respective users on particular categories of webpages within the website or on particular webpages within the website and dynamically update the one or more user interface elements associated to the one or more respective users to reflect one or more user interactions of the one or more respective users with the website.

BRIEF DESCRIPTION OF THE DRAWINGS

The accompanying drawings figures incorporated in and forming a part of this specification illustrate several aspects of the disclosure, and together with the description server to explain the principles of the disclosure.

FIG. 8 depicts a non-limiting embodiment for a home page of an administrator.

DETAILED DESCRIPTION

Figure 1:
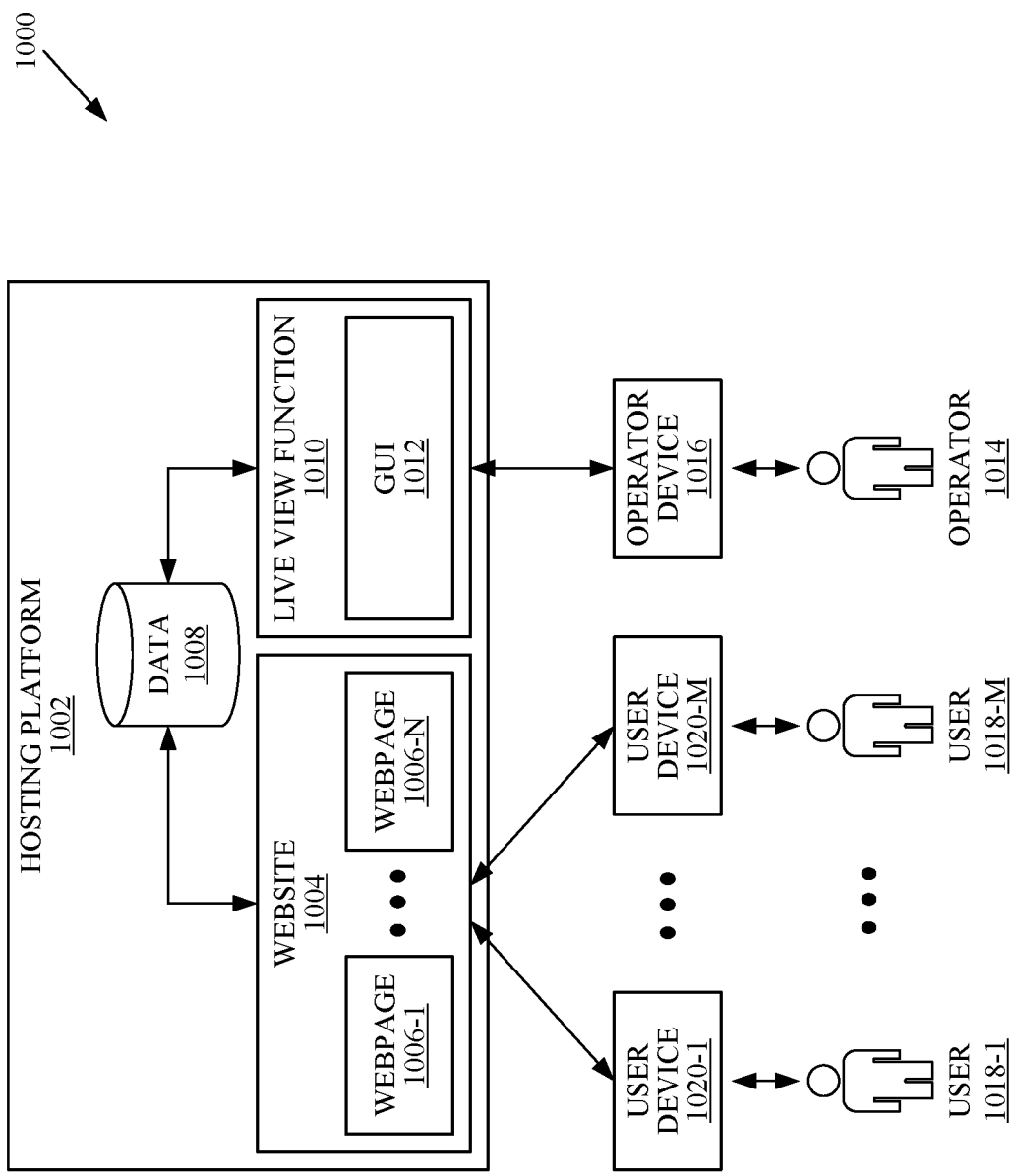
FIG. 1 illustrates one example of a system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that, as used herein, the term "comprising" (and other forms of the word "comprise") is which is synonymous with "including," "containing," or "characterized by," and is inclusive or open-ended and does not exclude additional, unrecited elements or steps. Conversely, the term "consisting of" (and other related forms) is synonymous with "including," "containing," or "characterized by," but is exclusive in that it excludes additional, unrecited elements or steps.

Unlike owners or managers of conventional brick-and-mortar stores, owners or managers of e-commerce stores are unable to monitor what is happening in their stores in real-time. For example, the owner or manager of a brick-and-mortar store can be physically present in the store and observe things such as, e.g., customers purchasing some items rather than others, customers lingering in certain areas around the store, etc. and are also able to engage customers in real-time as the customers shop (e.g., answer questions, suggest alternative items, etc.). The owners or managers of e-commerce stores have no way to quickly and easily monitor what is happening in their e-commerce stores in real-time.

Systems and methods are disclosed herein that address the aforementioned and/or other challenges. While the systems and methods disclosed herein are particularly well-suited for e-commerce, or online, stores, they are not limited thereto. Rather, the systems and methods disclosed herein are more generally applicable to any website for which an operator desires to have a "live" view of user presence and interactions with the website.

It should be noted that, as used herein, "user presence" within a website refers to a user browsing or otherwise viewing (e.g., via a web browser or custom application) a webpage(s) of the website. Likewise, user presence on a particular webpage of the website refers to the user browsing or otherwise viewing that particular webpage of the website. As the user navigates from a first webpage of the website to a second webpage of the website, the user's "presence" within the website changes from the first webpage of the website to the second webpage of the website. Further, user presence on a particular webpage may be dependent on one or more events. For example, a particular user may be considered to be present on a particular webpage when the particular user first navigates to the particular webpage. The particular user may then continue to be considered as present on the particular webpage until some other defined event has occurred such as, e.g., (a) the particular user navigates to another webpage either within or external to the website, (b) a predefined amount of time has expired since the particular user first navigated to the particular webpage within the website without the particular user navigating to another webpage within the website, or (c) a predefined amount of time has expired since the particular user first navigated to the particular webpage within the website without the particular user either navigating to another webpage within the website or interacting with the particular webpage.

More specifically, systems and methods are disclosed herein for generating and dynamically updating a Graphical User Interface (GUI) including user interface elements that represent users present on webpages within a website and user interactions with the website. In one example embodiment, the website is an e-commerce (or online) store, the users are customers, and the webpages of the website include webpages for respective products (i.e., product webpages) sold via the e-commerce store. The GUI is provided to an operator device (e.g., a personal computer, tablet computer, or smartphone) of an operator of the website where the GUI is then presented to the operator of the website (e.g., via a web browser or custom application). The GUI provides a "live" (i.e., real-time or near real-time) view of user presence and user interactions within the website. In some embodiments, the systems and methods also enable receiving and processing operator input(s).

In one embodiment, the systems and methods disclosed herein enable the operator of the website to, via the GUI, interact with the users or a particular user by, e.g., selecting the associated user interface element to, e.g., initiate a chat session, present a message to the user(s), or the like.

FIG. 1 illustrates a system 1000 in accordance with one embodiment of the present disclosure. As illustrated, the system 1000 includes a hosting platform 1002 that hosts a website 1004. The hosting platform 1002 may be a server computer, a virtualization environment (e.g., a virtual machine or container executing on a physical hardware platform such as a server computer), or the like. The website 1004 includes multiple webpages 1006-1 to 1006-N. The hosting platform 1002 may also include a database 1008 that stores data representative of user presence within the website 1004 and user interactions with the website 1004. The user interactions with the website 1004 may include, e.g., navigating to the website 1004, navigating to a webpage 1006 within the website 1004, clicking on a link within a webpage 1006 of the website 1004, adding a product to the user's shopping cart, removing a product from the user's shopping cart, scrolling vertically or horizontally through multiple sections, navigating within a carousel, client-side rendering of single page apps, or the like.

The hosting platform 1002 also includes a live view function 1010, which is preferably implemented in software executed by processing circuitry of the hosting platform 1002. The live view function 1010 operates to generate and update a GUI 1012 that is presented to an operator 1014 at, in this example, an operator device 1016. The operator device 1016 may be any type of computing device such as, e.g., a personal computer, a smartphone, a tablet computer, or the like, where the operator device 1016 is connected to the hosting platform 1002 via a public or private network (e.g., the Internet). The GUI 1012 includes a representation of the website 1004 as well as User Interface (UI) elements that are dynamically updated to represent user presence and user interactions within the website 1004. More specifically, as users 1018-1 to 1018-M interact with the website 1004 via associated user devices 1020-1 to 1020-M, the live view function 1010 generates and dynamically updates the GUI 1012 to reflect the presence of the users 1018 within the website 1004 as well as the user interactions of the users 1018 within the website 1004. The user devices 1020-1 to 1020-M may each be any type of computing device such as, e.g., a personal computer, a smartphone, a tablet computer, or the like and be connected to the hosting platform 1002 via a public or private network (e.g., the Internet).

Figure 2:
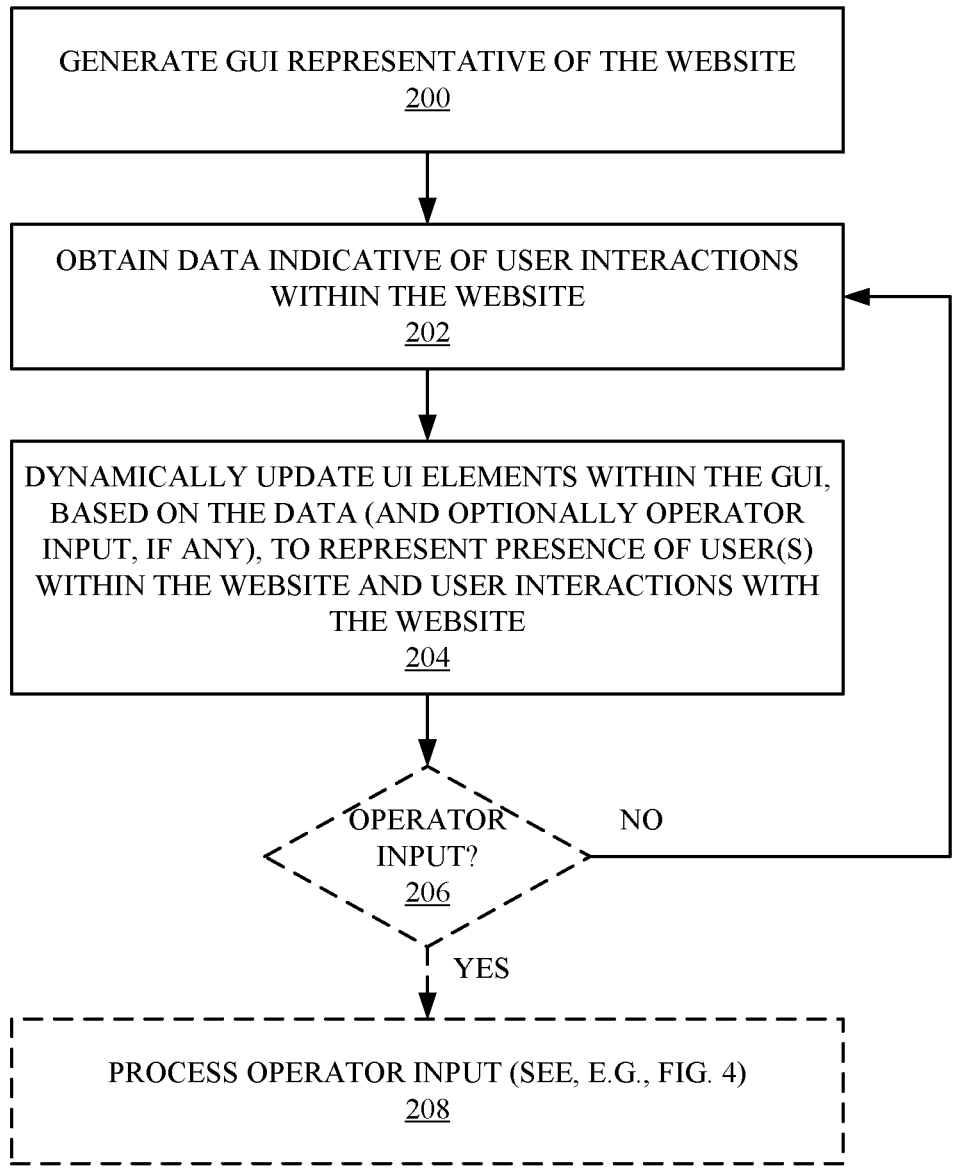
FIG. 2 is a flow chart that illustrates the operation of the live view function of FIG. 1 in accordance with embodiments of the present disclosure.

FIG. 2 is a flow chart that illustrates the operation of the live view function 1010 in accordance with one embodiment of the present disclosure. Optional steps are represented by dashed lines/boxes. As illustrated, the live view function 1010 generates the GUI 1012, which is representative of the website 1004 (step 200). While not illustrated, the GUI 1012 is provided to the operator device 1016, where the operator device 1016 presents the GUI 1012 to the operator 1014. Note that the manner in which the GUI 1012 is provided to the operator device 1016 may vary depending on the particular implementation. In one embodiment, the GUI 1012 is provided to the operator device 1016 as data (e.g., in a predefined data structure) that is processed by the operator device 1016 (e.g., at a client application at the operator device 1016) to render the GUI 1012 at the operator device 1016. Note that this GUI 1012 is dynamically updated over time as described herein to provide a "live view" of the website 1004.

It should be noted that while the live view function 1010 is illustrated in FIG. 1 and described herein as being implemented on the hosting platform 1002, the present disclosure is not limited thereto. The live view function 1010 may alternatively be implemented at a separate computing system (e.g., a separate server), implemented at the operator device 1016 (in which case data used by the live view function 1010 to generate the GUI 1012 as described herein may be provided to the operator device 1016, e.g., from the hosting platform 1002), or implemented in a distributed manner in which part of the functionality of the live view function 1010 is implemented at the hosting platform 1002 and another part of the functionality of the live view function 1010 is implemented at the operator device 1016.

The GUI 1012 includes UI elements that represent the webpages 1006-1 through 1006-N of the website 1004 and, in some embodiments, categories of webpages of the website 1004. For the initial step 200, in one embodiment, it is assumed that no users are present and that no user interactions have yet occurred. However, in another embodiment, the GUI 1012 may initially be presented based on data (e.g., from the database 1008) indicative of one or more of the users 1018 that are presently on the website 1004 and one or more user interactions of those users 1018 with the website 1004, e.g., during a defined time window relative to the current time (e.g., within the last X minutes, where "X" is a positive integer value greater than or equal to 1).

Once the GUI 1012 is generated, the live view function 1010 obtains data indicative of user presence and user interactions within the website 1004 (step 202) and dynamically updates the UI elements within the GUI 1012, based on the obtained data, to represent the presence of users (e.g., any one or more of the users 1018 that are presently on the website 1004) and any interactions of those users with the website 1004 at the present time (step 204). As discussed above, user presence refers to the presence of the users 1018 on the webpages 1006 within the website 1004. Examples of user interactions that may be represented by the UI elements within the GUI 1012 include, e.g., clicking on a link (e.g., to another webpage 1006 within the website 1004, a link to an external website, a link for an advertised product or service), placing products in their shopping cart, removing products from their shopping cart, purchasing products, or the like.

The dynamically updated UI elements generally include UI elements that provide a visual representation of the state of the webpages 1006 within the website 1004 including visual representations of the users 1018 present on the webpages 1006 within the website 1004 or categories of webpages within the website 1004 and/or user interactions with the website 1004. Thus, the dynamically updated UI elements are to be distinguished from mere statistical information (e.g., a number representing the number of users viewing a streaming video from a webpage of a website). Rather, the dynamically updated UI elements provide a visualization to the operator 1014 that enables the operator 1014 to observe how the users 1018 navigate through and/or interact with the webpages 1006 of the website 1004. The dynamically updated UI elements may include, e.g., UI elements that represent any one or any combination of the following:

categories of webpages within the website 1004, where the respective UI elements may be dynamically updated to reflect particular users 1018 that are present on the webpages 1006 within the category, a number of users 1018 that are present on the webpages 1006 within the category, user interactions made by the users 1018 that are present on the webpages 1006 within the category, or the like;

the webpages 1006 within the website 1004, where the respective UI elements may be dynamically updated to reflect particular users 1018 that are present on the webpages 1006 within the website 1004, a number of users 1018 that are present on the webpages 1006 within the website 1004, user interactions made by the users 1018 that are present on the webpages 1006 within the website 1004, or the like;

the users 1018, where the UI elements representing the users 1018 may be dynamically updated to:

represent the presence of the respective users 1018 on the webpages 1006 or categories of webpages within the website 1004 (e.g., the UI moves throughout a graphical representation of the website 1004 to represent the presence, or location, of the respective users 1018 on the webpages 1006 or categories of webpages within the website, and/or represent user interactions of the respective users 1018 with the website 1006 (e.g., adding a product to the user's shopping cart, etc.);

a navigation path of a user 1018 within the website 1004; state of the website 1004; or state of the users 1018 navigating the webpages 1006 within the website 1004.

Further, the UI elements may be dynamically updated by altering any desired characteristic of the UI elements such as, e.g., position, size, shape, color, motion, animation (e.g., flashing), or the like. Motion may be used to signal, to the operator 1014, the user 1018 navigating from one webpage 1006-*i* to another webpage 1006-*j*. While this is a single event in time, a multi-frame animation designed to get the operator's attention may consist of a second or more of animated motion, flashing, color changing, or the like of the UI element that represents the user 1018, e.g., as it moves from the UI element representing the webpage 1006-*i* to the UI that represents the webpage 1006-*j*.

Figure 3:
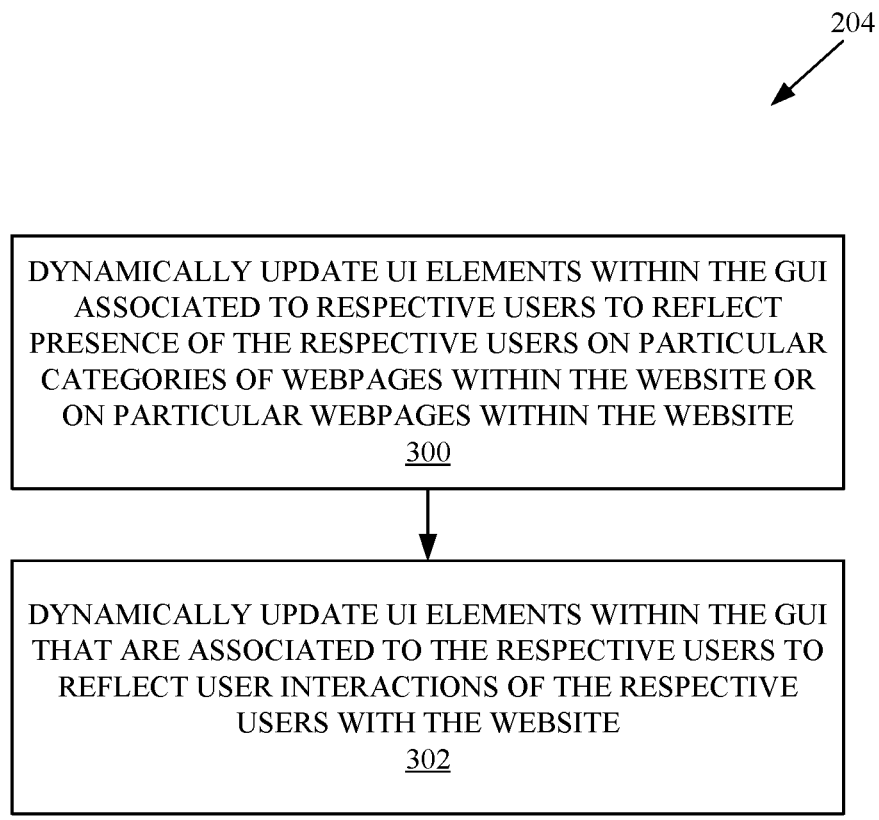
FIG. 3 is a flow chart that illustrates step 204 of FIG. 2 in more detail, in accordance with one embodiment of the present disclosure.

FIG. 3 illustrates one example embodiment of step 204. In this example embodiment, dynamically updating the UI elements in step 204 includes dynamically updating UI elements within the GUI 1012 associated to respective users 1018 to reflect the presence of the respective users 1018 on particular categories of webpages within the website 1004 and/or on particular webpages 1006 within the website 1004 (step 300). Dynamically updating the UI elements in step 204 may additionally or alternatively include dynamically updating UI elements within the GUI 1012 that are associated to the respective users 1018 to reflect user interactions of the respective users 1018 with the website 1004 (step 302).

Returning to the process of FIG. 2, in one embodiment, the live view function 1010 also determines whether input from the operator 1014 has been received (step 206). The operator input may be, for example:

an operator input that selects a different view for the GUI 1012:

Note that there may be multiple different "views" for the GUI 1012 such as, e.g., a main view in which the GUI 1012 presents user presence and user interactions for the entire website 1004, a user-specific view in which the GUI 1012 presents user presence and user interactions for a specific (selected) user, one or more filter views where the presented user presence or user interactions are filtered based on one or more criteria (e.g., show information only for users that have purchased items in the past, show information only for new customers, show information only for users that have an item(s) in their shopping cart, etc.);

an operator input that initiates an interaction (e.g., chat) with a particular user;

an operator input that requests an administrative function; or any other suitable type of operator input.

If an operator input has not been received (step 206, NO), the process returns to step 202 and is repeated such that the live view function 1010 continues to update the GUI 1012 as user presence within the website 1004 changes and new user interactions with the website 1004 occur. In this manner, the dynamic updating of the GUI 1012 is in real-time or near-real-time (e.g., updated every 10 seconds or the like) such that the operator 1014 is presented with a "live" view of what is happening on the website 1004.

Figure 4:
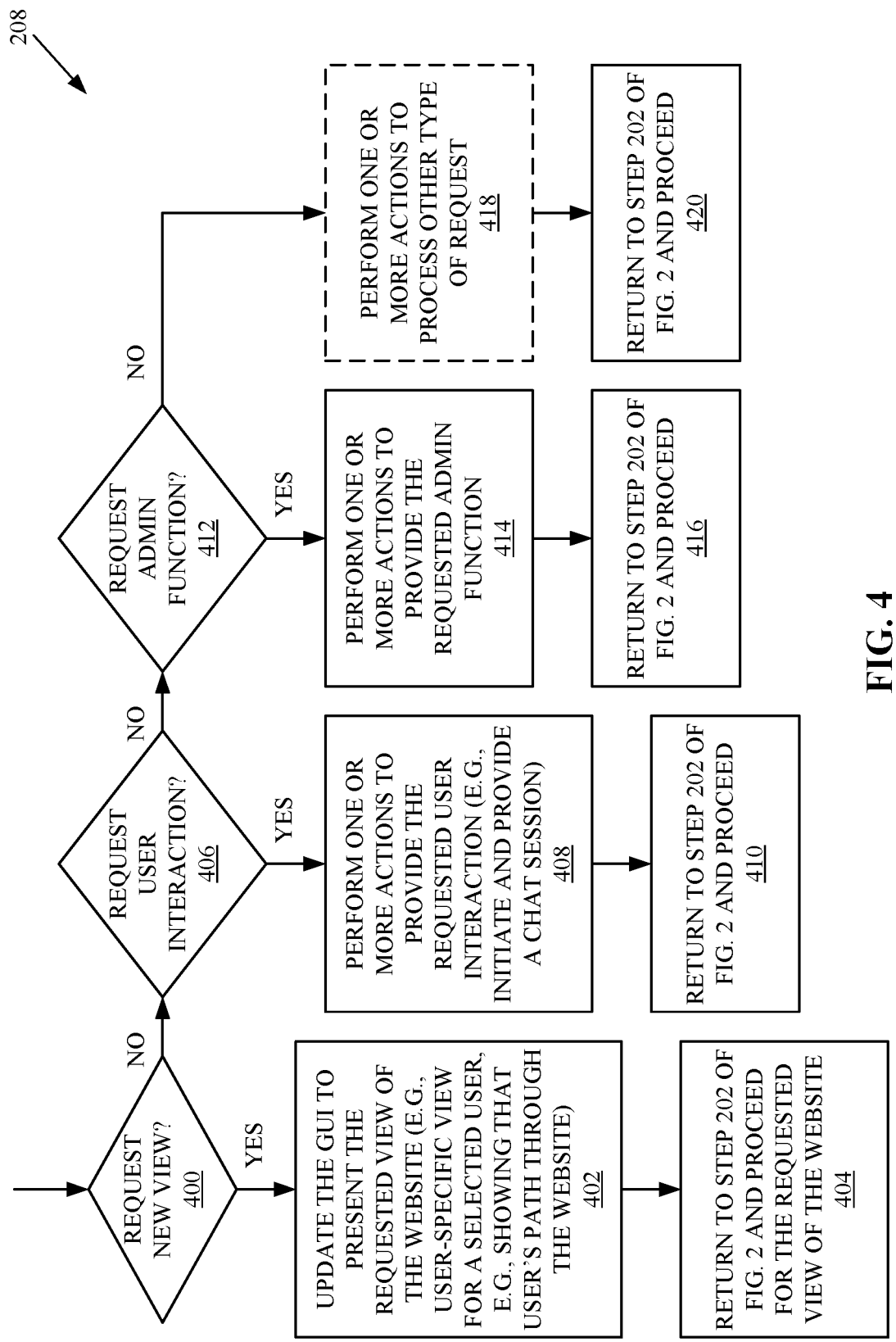
FIG. 4 is a flow chart that illustrates step 208 of FIG. 2 in more detail, in accordance with one embodiment of the present disclosure.

If input from the operator 1014 has been received (step 206, YES), the live view function 1010 performs one or more actions that process the operator input (step 208). Details of one example embodiment of step 208 are illustrated in the flow chart of FIG. 4. As illustrated in FIG. 4, in one example embodiment, if the received operator input is indicative of a request for a new view (i.e., a request to change the view) of the GUI 1012 (step 400, YES), the live view function 1010 updates the GUI 1012 to present the requested view of the website 1004 (step 402). As one example, the requested view may be a user-specific view wherein, in the user-specific view, the GUI 1012 is updated to show the navigation path of the selected user through the website 1004, the current location of the user within the website 1004 (i.e., which webpage 1006 the user is currently on), and user interactions of the user with the website 1004. The live view function 1010 then returns to step 202 of the process of FIG. 2 and proceeds with dynamic updates for the selected view of the GUI 1012 (step 404).

If input from the operator 1014 has not been received (step 206, NO), and if the operator input is a request for interaction with a specific user (step 406, YES), the live view function 1010 performs one or more actions to provide the requested user interaction (e.g., perform a chat session with the specific user) (step 408) and then the process returns to step 202 of the process of FIG. 2 and proceeds with dynamic updates for the GUI 1012 (step 410).

If the operator input is not a request for interaction with a specific user (step 406, NO), and if the operator input is a request for an administrative function (step 412, YES), the live view function 1010 performs one or more actions to provide the requested administrative function (step 414) and then the process returns to step 202 of the process of FIG. 2 and proceeds with dynamic updates for the GUI 1012 (step 416).

If the operator input is some other type of operator input (step 412, NO), the live view function 1010 may perform one or more actions to process the other type of operator input (step 418) and then the process returns to step 202 of the process of FIG. 2 and proceeds with dynamic updates for the GUI 1012 (step 420).

Figure 5A:
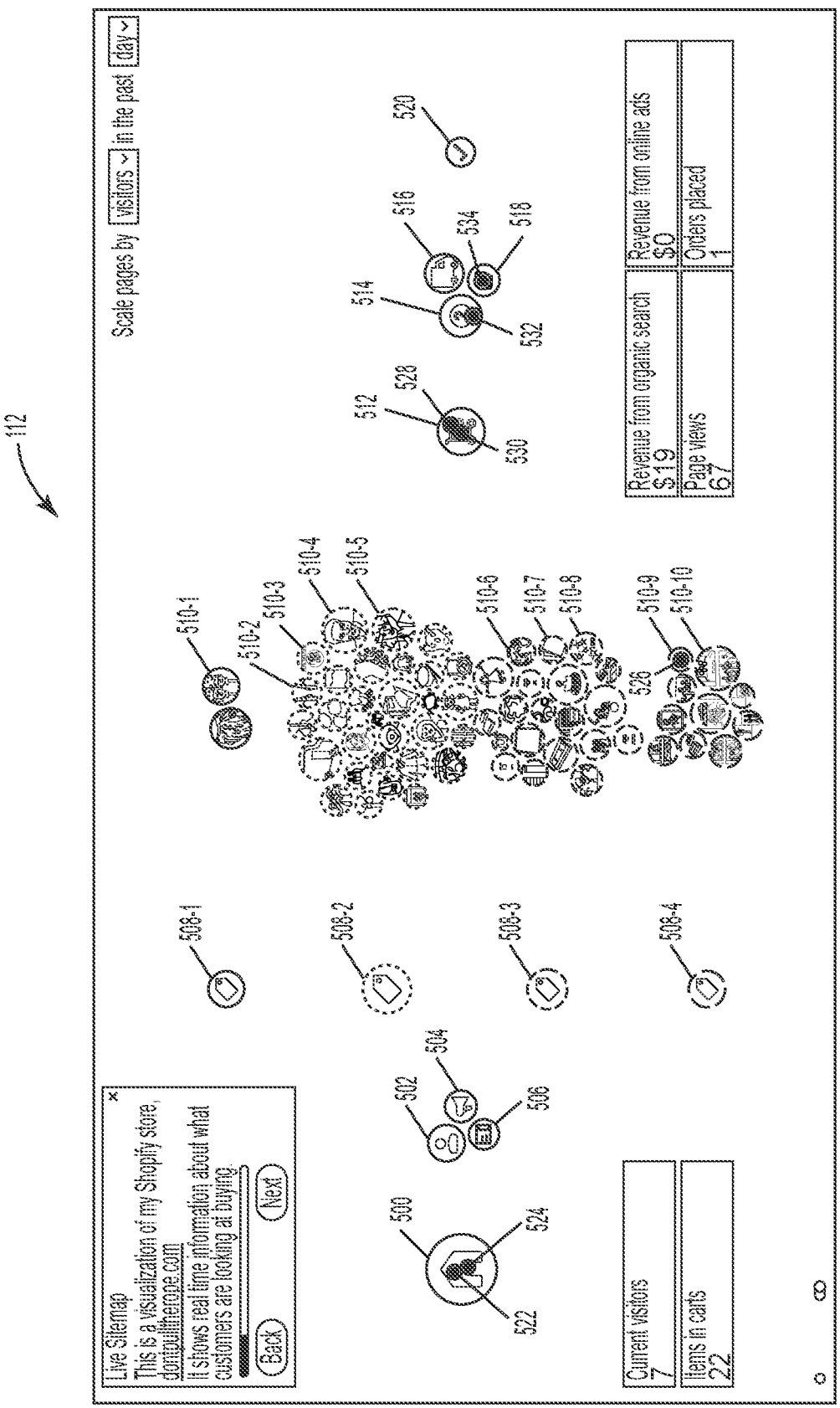
FIGS. 5A through 5M illustrate examples of a demo version of a Graphical User Interface (GUI) for one example implementation of at least some of the embodiments described herein.

FIGS. 5A through 5M illustrate examples of a demo version of the GUI 1012 for one example implementation of at least some of the embodiments described herein. This demo version includes comment bubbles explaining certain aspects of the example embodiments illustrated therein. In the illustrated example, the website 1004 is an e-commerce store. FIG. 5A illustrates the GUI 1012 at the start of the demo. As illustrated, the GUI 1012 includes the following UI elements:

UI elements representative of the webpages or categories of webpages within the e-commerce store, where in this example these UI elements include:

UI element 500, which is representative of a home page of the e-commerce store;

UI element 502, which is representative of a contact page of the e-commerce store;

UI element 504, which is representative of Contact Us page(s);

UI element 506, which is representative of Blog page(s);

UI elements 508-1 through 508-4, which are representative of respective categories of webpages (e.g., categories of products) within the e-commerce store;

UI elements 510-1 through 510-10, which are representative of respective product pages (i.e., webpages within the e-commerce store on which respective products are offered for sale). Note that only ten (10) of the UI elements 510 representative of respective product pages are labelled with reference numbers in the figures for clarity reasons. As such, the UI elements representative of respective product pages are referred to generally as UI elements 510; and UI elements 512 through 520, which are representative of a shopping cart webpage, customer information webpage (where the user enters information about the user such as, e.g., name, email address, mailing address, phone number, etc.), a shipping webpage, a payment webpage, and a purchase complete webpage within a checkout procedure of the e-commerce store; and UI elements representative of users 1018 present within the e-commerce store, where in FIG. 5A these UI elements include:

UI elements 522 and 524 representative of two users that are present on the home page of the e-commerce store;

UI element 526 representative of a user that is present on a particular product page (i.e., the product page represented by the UI 510-9);

UI elements 528 and 530 representative of two users that are present in their respective shopping cart pages;

UI element 532 representative of a user that is present on the customer information page; and UI element 534 representative of a user that is present on a payment page.

In the illustrated example, the UI elements representative of the webpages within the e-commerce store (i.e., the UI elements 500 through 520) are bubbles where the sizes of the bubbles represent the number of users that have visited the respective webpages or categories of webpages within a defined amount of time. This defined amount of time is, in this example, configurable (e.g., configured as hour, day, week, or the like) by a pull-down window in the top right-hand corner of the GUI 1012. However, this defined amount of time may alternatively be predefined (e.g., static).

Figure 5B:
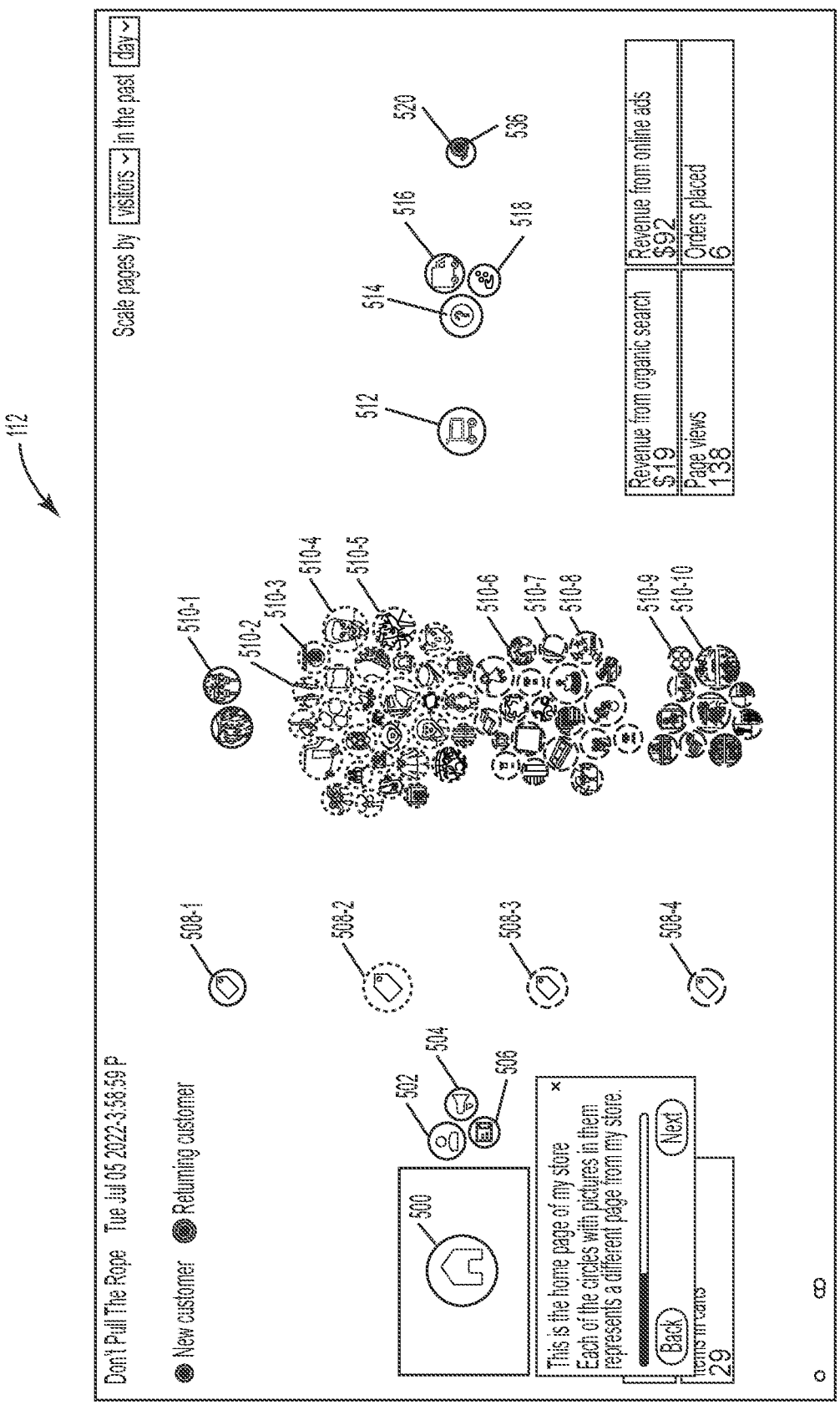

FIG. 5B illustrates a next step of the demo that highlights the UI element 500 that represents the home page of the e-commerce store. In this example, UI element 536 represents a user present on the purchase complete page.

Figure 5C:
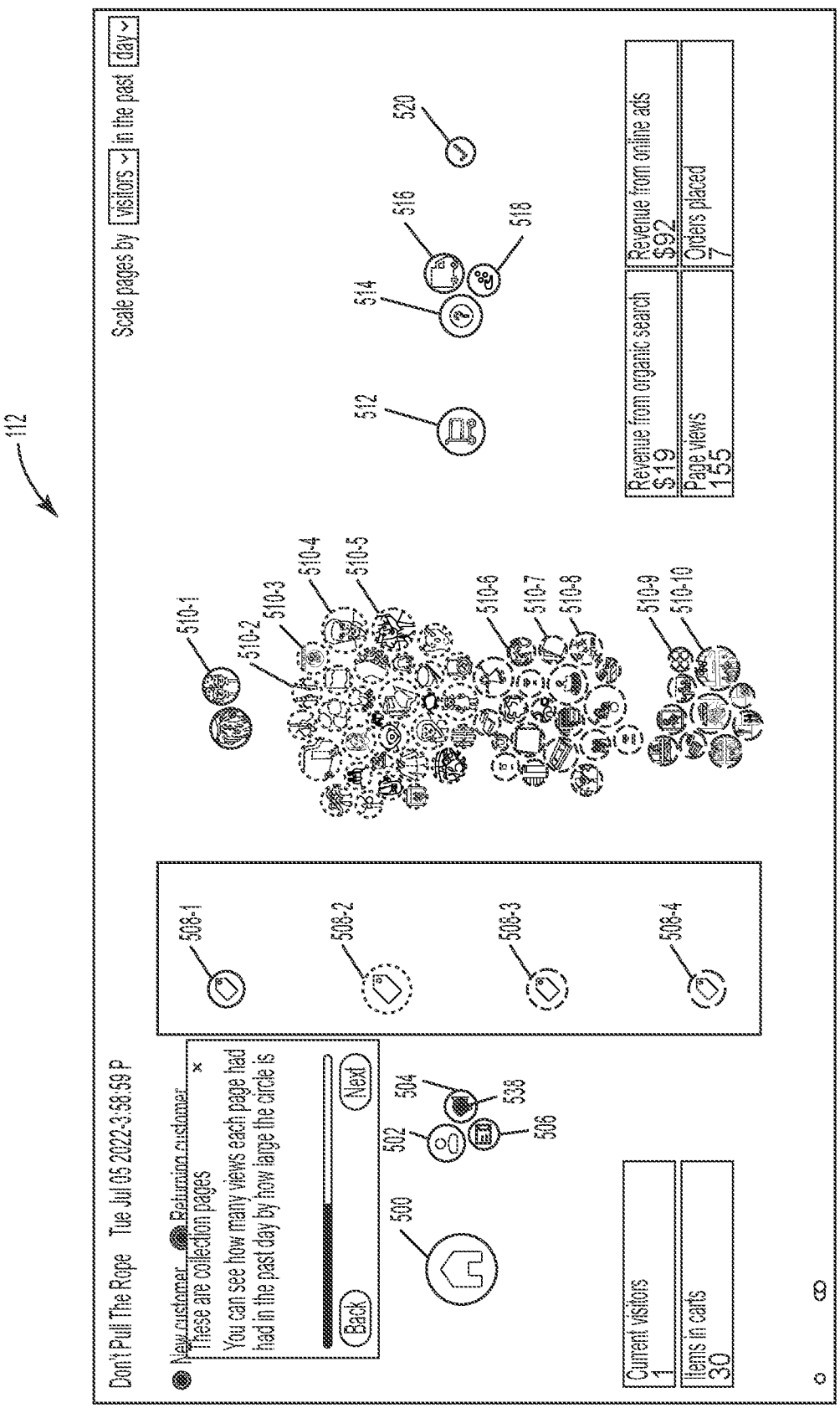

FIG. 5C illustrates a next step of the demo that highlights the UI elements 508-1 through 508-4 that represent respective categories (also called "collections") of product pages within the e-commerce store. In this example, UI element 538 represents a user present on the Contact Us page(s) 504.

Figure 5D:
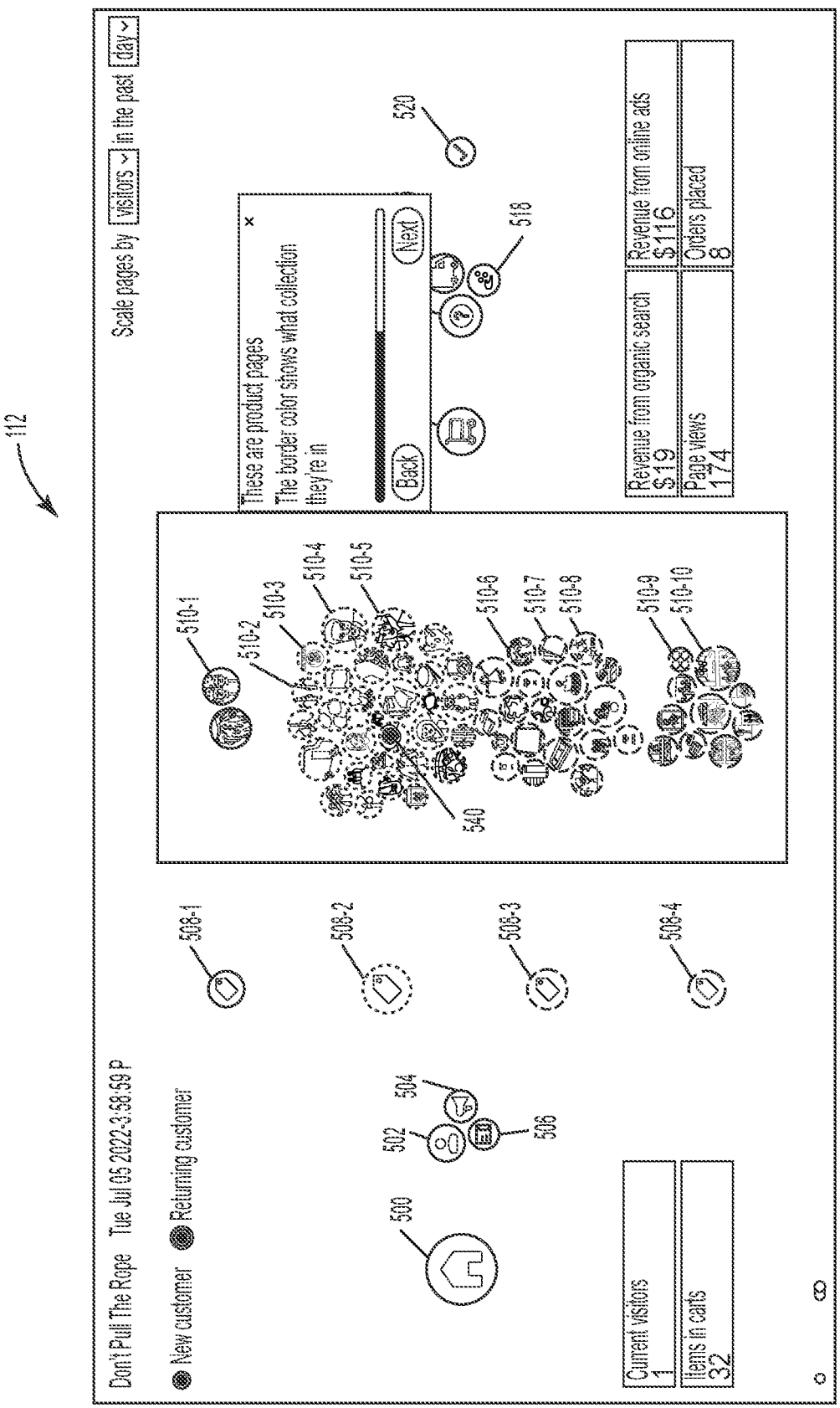

FIG. 5D illustrates a next step of the demo that highlights the UI elements 510 that represent respective product pages within the e-commerce store. In this example, borders of the UI elements 510 are different for the different categories of product pages. In this example, UI element 540 represents a user present on one of the product pages in the second category.

Figure 5E:
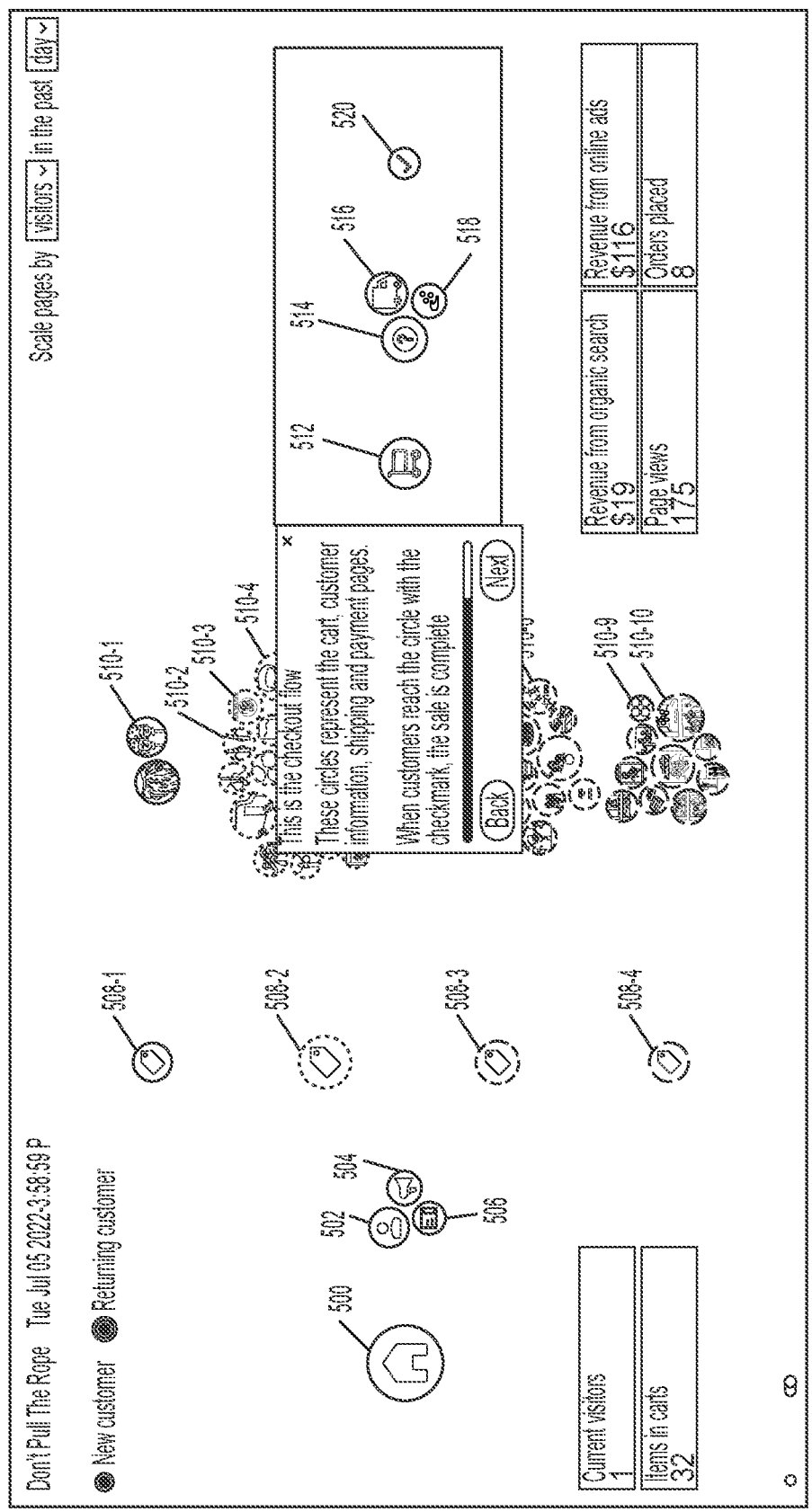

FIG. 5E illustrates a next step of the demo that highlights the UI elements 512 through 520 that represent webpages within the e-commerce store for the checkout flow.

Figure 5F:
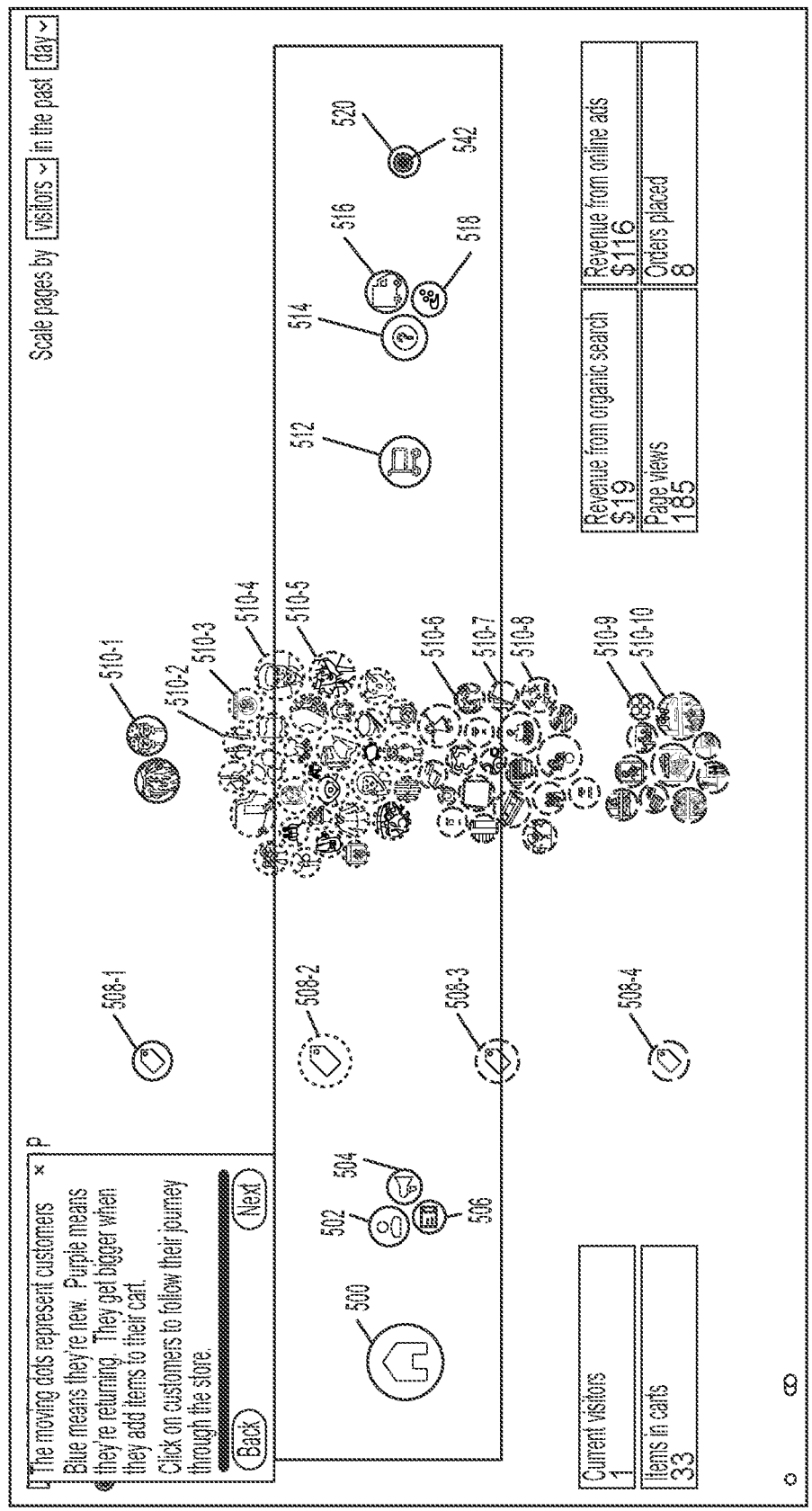

FIG. 5F illustrates a UI element 542 that represents a user. In the illustrated example, the UI element 542 is a dot. Via the dynamic updating process described herein, the UI element 542 is updated to reflect movement of the respective user within the e-commerce store (i.e., the UI element 542 moves from the UI elements representative of different webpages within the e-commerce store as the respective user navigates from one webpage to another). In addition, the UI element 542 may be dynamically updated to reflect user interactions between the respective user and the e-commerce store. For example, the UI element 542 may blink or otherwise be modified to reflect that the respective user has added an item to the user's shopping cart or purchased an item.

Figure 5G:
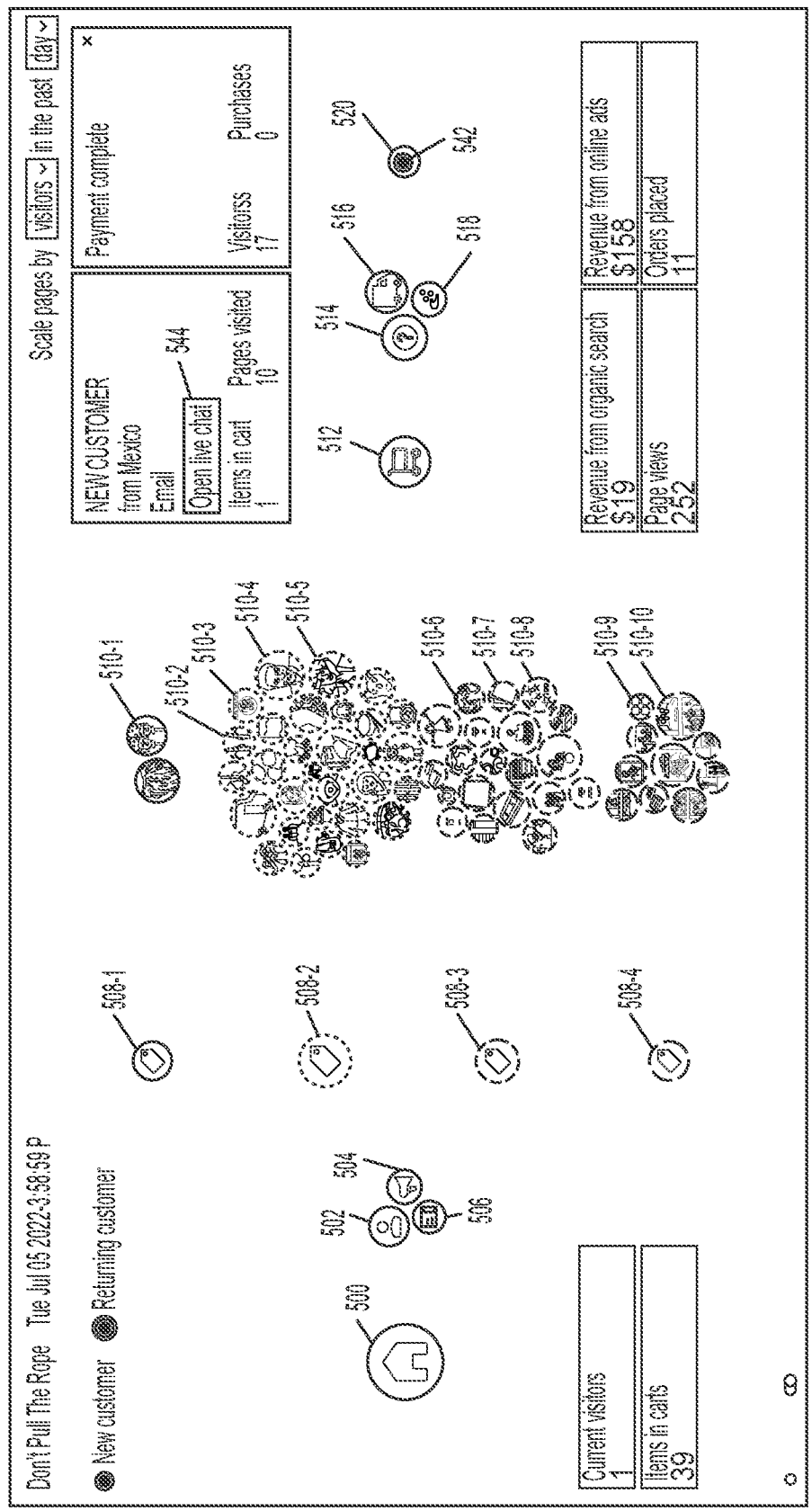

FIG. 5G illustrates one example of the GUI 1012 when the operator 1014 has selected (e.g., clicked on) the UI element 542. In this example, in response thereto, the GUI 1012 is updated to present information about the respective user (e.g., information that indicates that, in this example, the user is a "new customer from Mexico", has 1 item in his or her cart, and has visited 10 pages within the e-commerce store. In addition, in this example, the GUI 1012 is updated to include a UI element 544 that enables the operator 1014 to initiate a chat session with the user. In this example, the GUI 1012 is also updated to include information about the webpage on which the selected user is located, which in this example is the "Payment Complete" webpage.

Figure 5H:
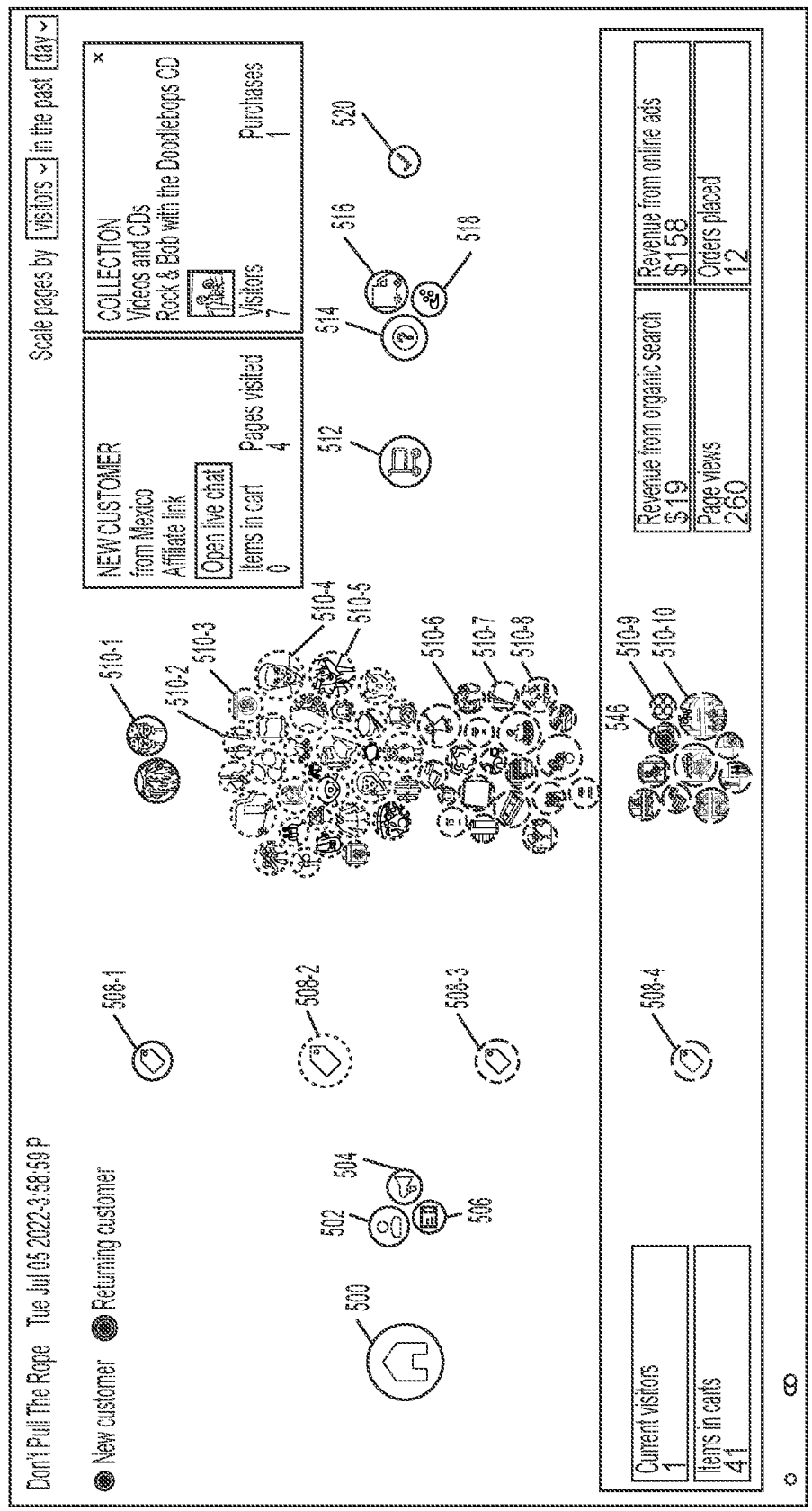

FIG. 5H illustrates another example of the GUI 1012 when the operator 1014 has selected (e.g., clicked on) a UI element 546 representative of a user that is located on a particular product page. In this example, in response thereto, the GUI 1012 is updated to present information about that user and information about the particular product page.

Figure 5I:
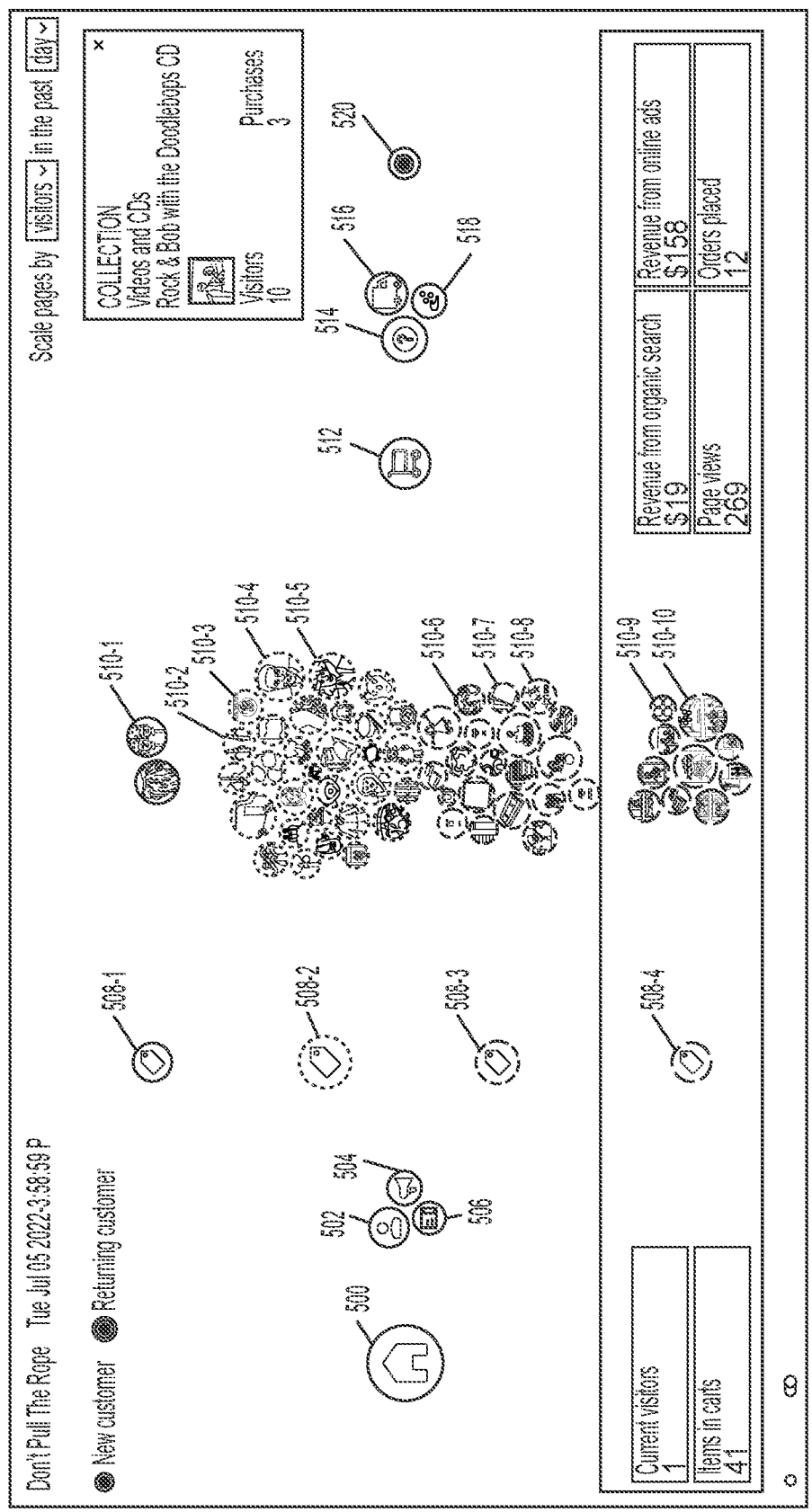

FIG. 5I illustrates an example of the GUI 1012 when the operator 1014 has selected (e.g., clicked on) the UI element 510-9 representative of a particular product webpage. In this example, in response thereto, the GUI 1012 is updated to include information about the particular product webpage.

Figure 5J:
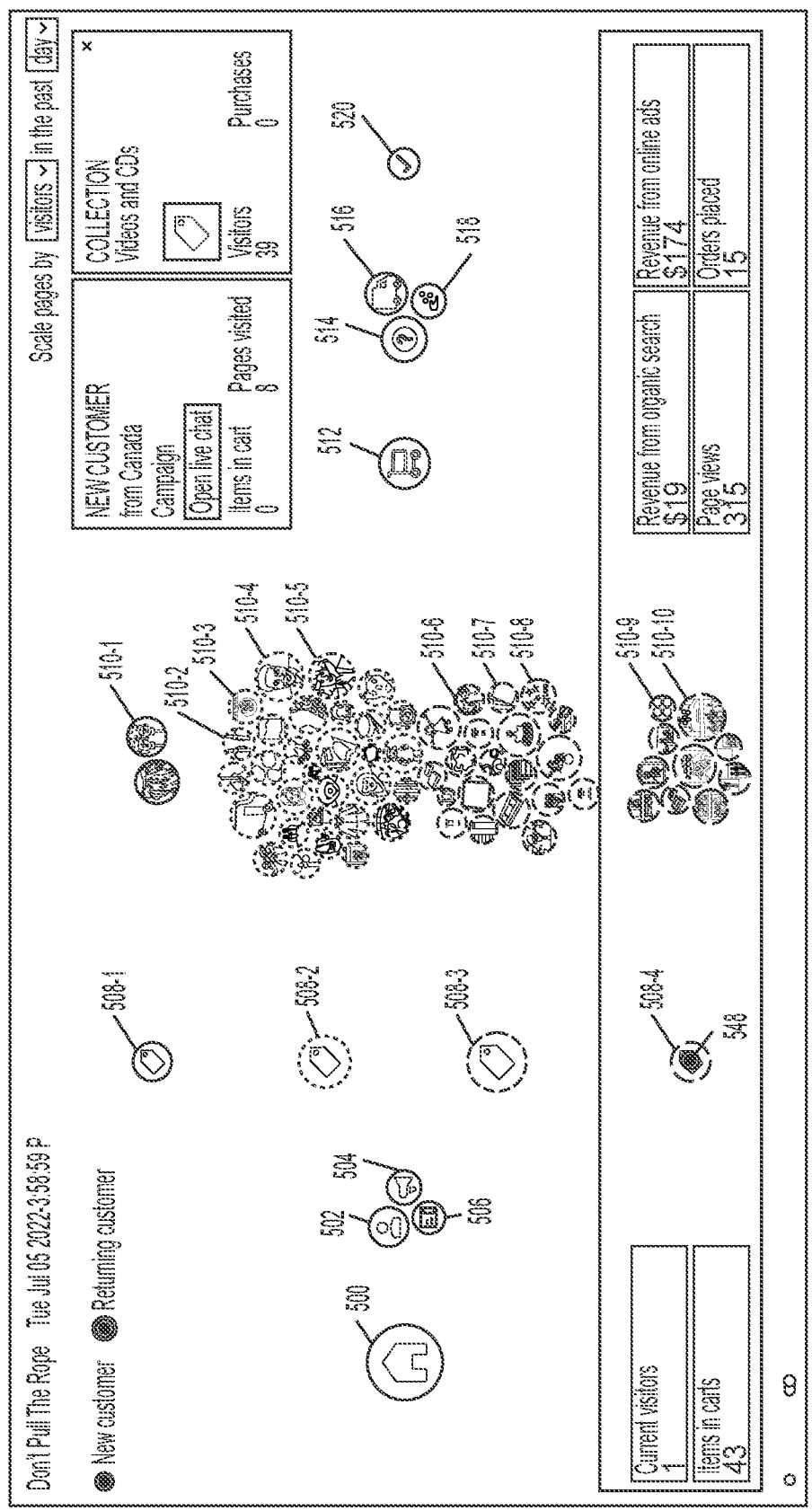

FIG. 5J illustrates another example of the GUI 1012 when the operator 1014 has selected (e.g., clicked on) a UI element 548 representative of a particular user located on a webpage within a particular category. In this example, in response thereto, the GUI 1012 is updated to include information about the particular user as well as information about the particular category of webpages within the e-commerce store.

Figure 5K:
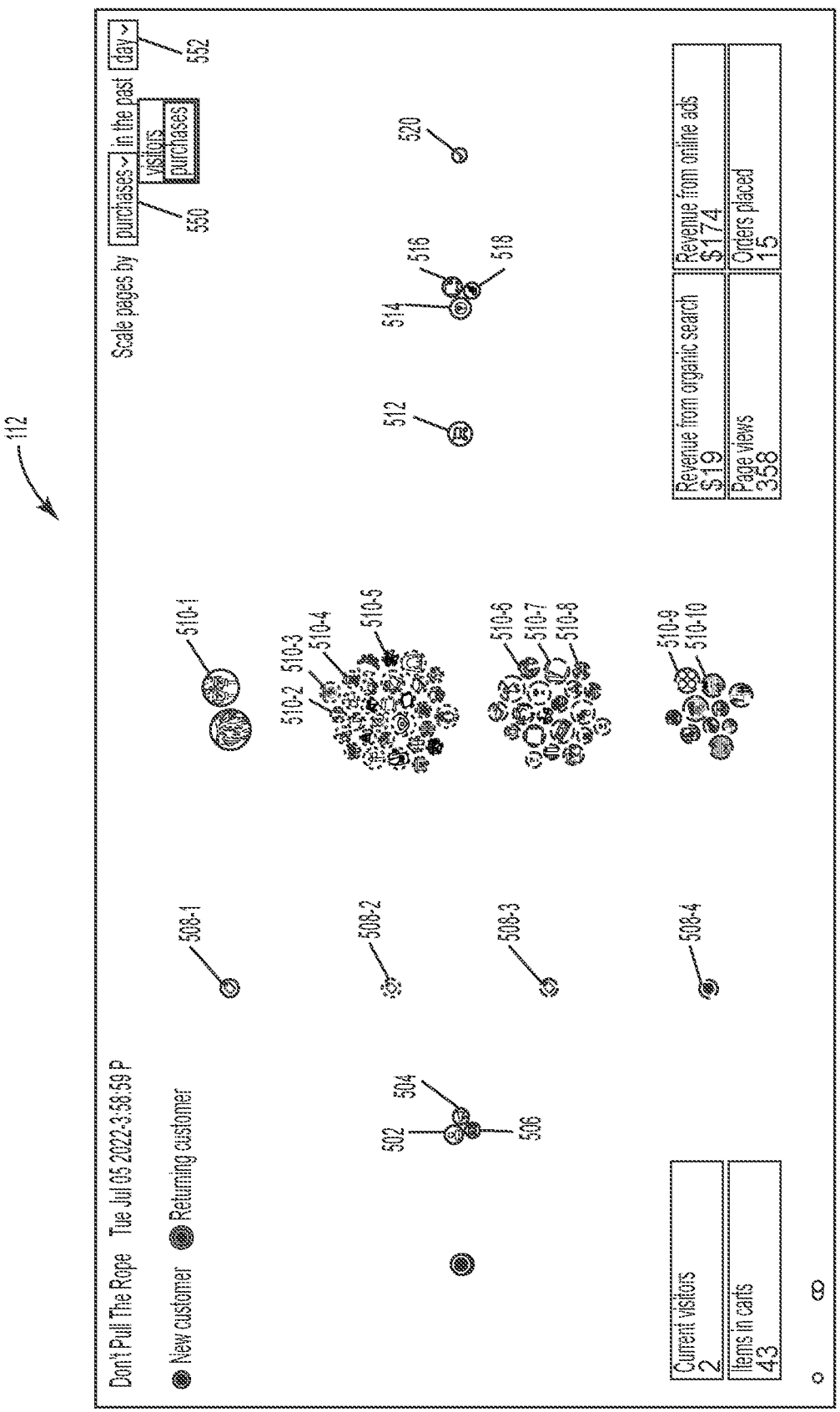
Figure 5L:
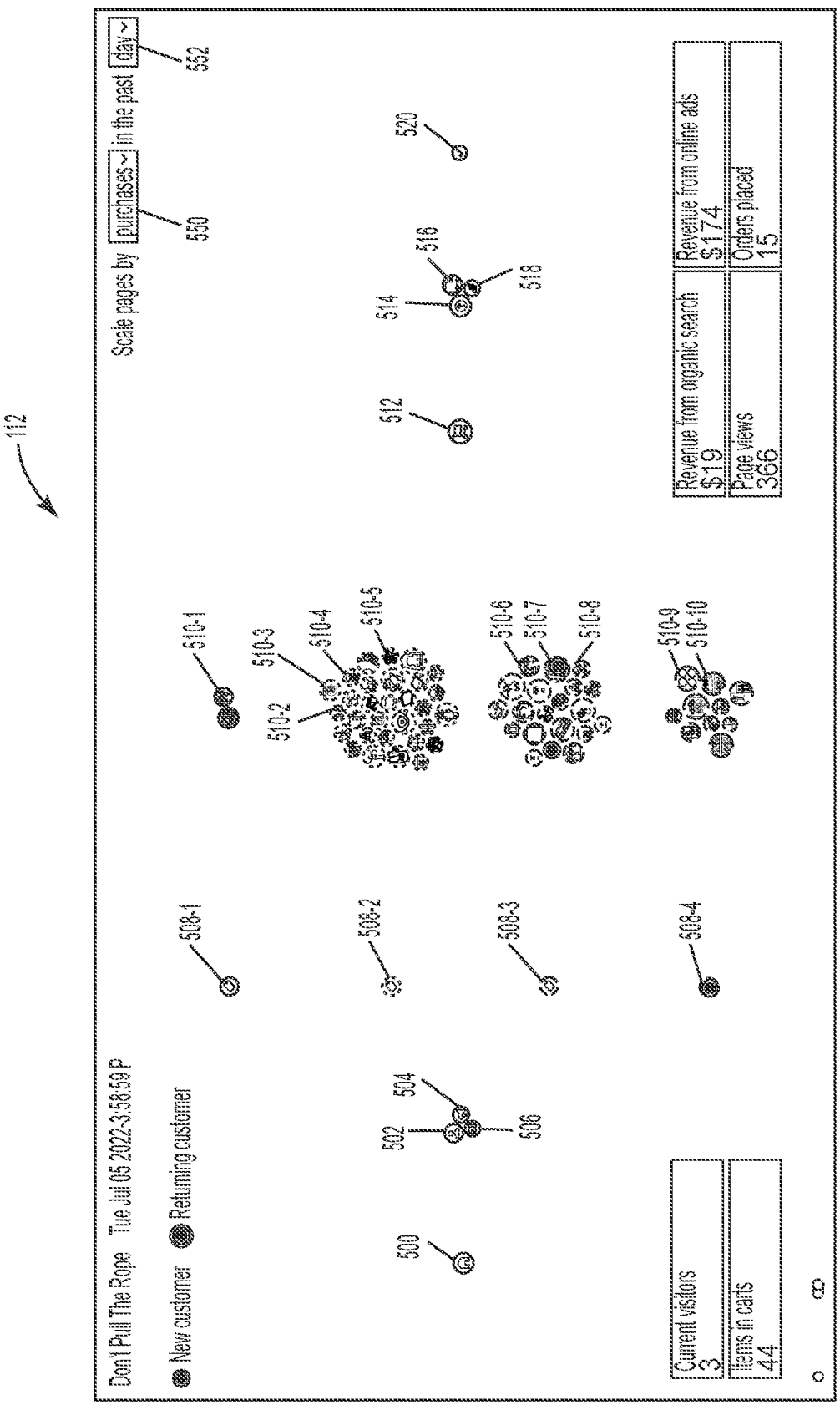
Figure 5M:
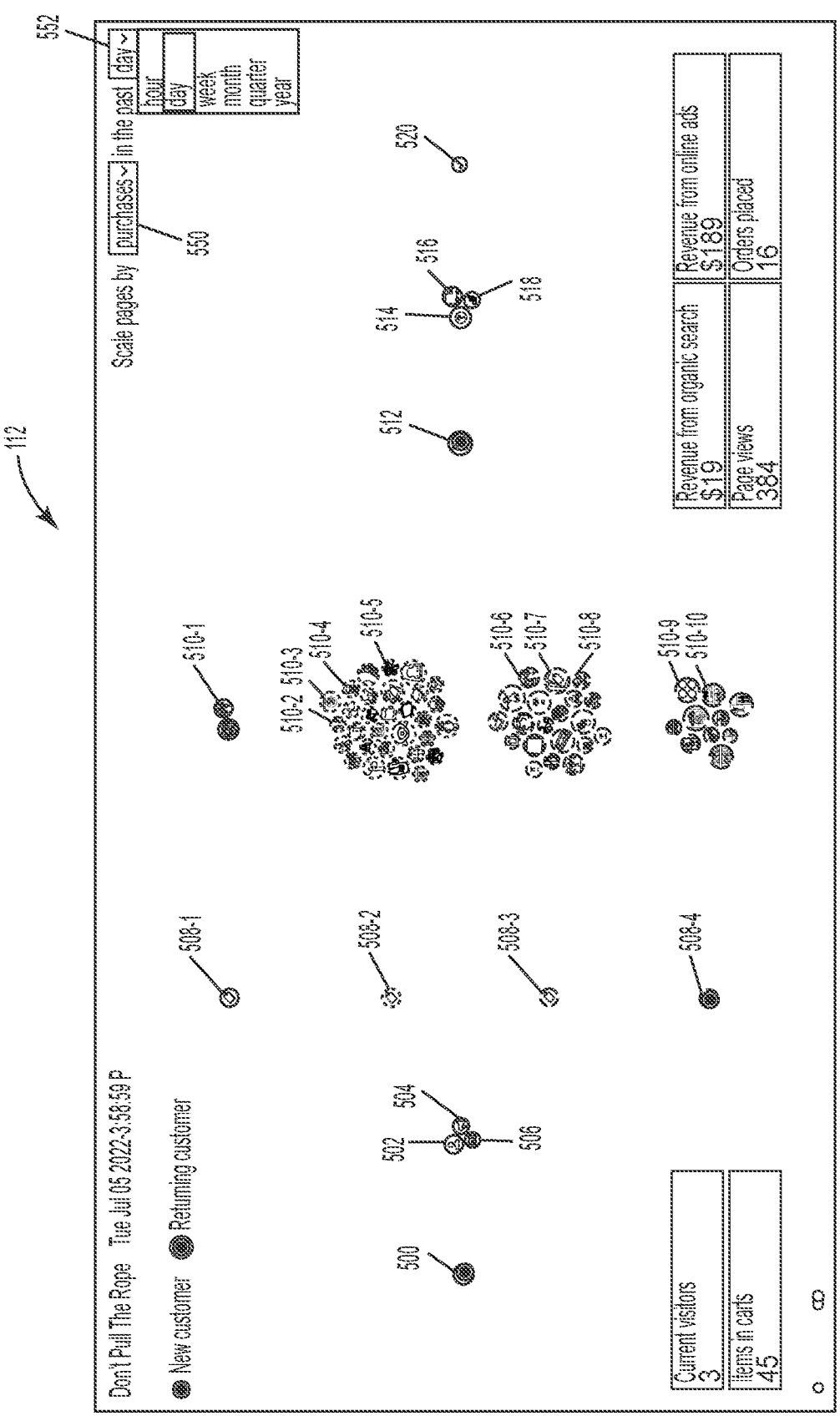

FIG. 5K illustrates one example of the GUI 1012 that includes a feature 550 that enables the operator 1014 to configure the manner in which the UI elements within the GUI 1012 are scaled. In this example, the feature 550 is a drop-down menu in which the operator 1014 is enabled to select either "visitors" or "purchases". If "visitors" is selected, then the UI elements 500-520 are scaled (e.g., the sizes of the UI elements 500-520 in the GUI 1012 are scaled) based on the number of visitors (i.e., the number of users that have visited the respective webpages or categories of webpages) within a defined (e.g., configured) amount of time. In this example, the operator 1014 is able to configure this defined amount of time via a feature 552 of the GUI 1012, which in this example is another drop-down menu (see, e.g., FIG. 5M). In the example of FIG. 5M, the defined amount of time may be an hour, a day, a week, a month, a quarter (i.e., 3 months), or a year. In FIG. 5K, the scaling is based on the number of visitors. FIG. 5L illustrates the GUI 1012 when scaling is based on the number of purchases.

Figure 6:
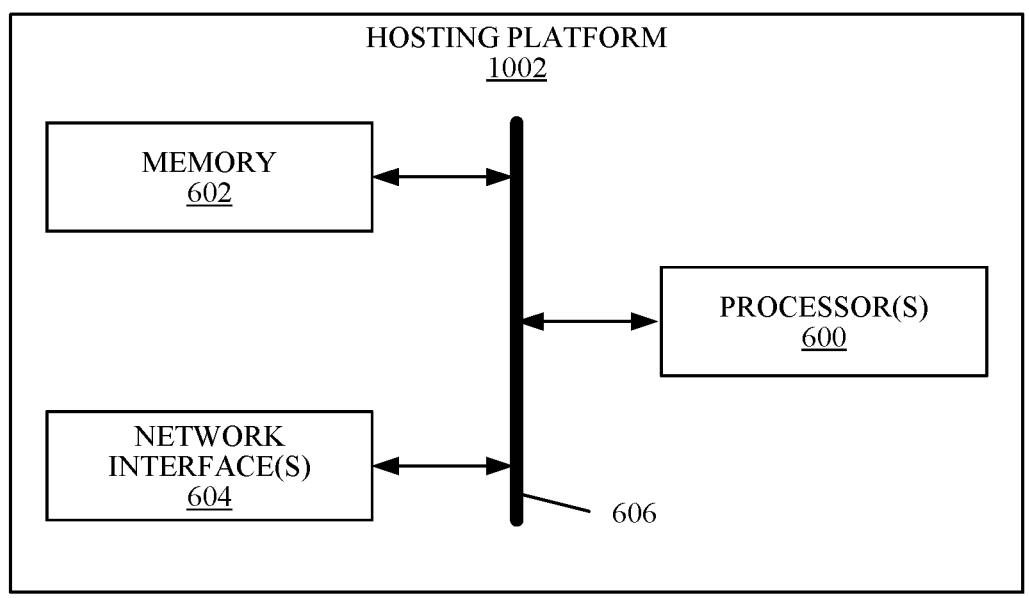
FIG. 6 is a schematic block diagram of an example embodiment of the hosting platform of FIG. 1.

FIG. 6 is a schematic block diagram of one example embodiment of the hosting platform 1002. As illustrated, the hosting platform 1002 is implemented as a computing system that includes one or more processors 600 (e.g., Central Processing Units (CPUs), Application Specific Integrated Circuits (ASICs), Field Programmable Gate Arrays (FPGAs), and/or the like), memory 602, and one or more network interfaces 604 (e.g., a Wi-Fi network interface, a cellular (e.g., Fifth Generation (5G)) interface, an Ethernet network interface, or the like), connected via a bus 606 or the like. The processors 600 are also referred to herein as processing circuitry. In some embodiments, the live view function 1010 described above is implemented in software that is stored in the memory 602 and executed by the processor(s) 600. Note that the hosting platform 1002 may include additional components not illustrated in FIG. 6 such as, e.g., a power supply (e.g., a battery and associated power circuitry), etc.

In some embodiments, a computer program including instructions which, when executed by at least one processor, causes the at least one processor to carry out the functionality of the live view function 1010, according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium such as memory).

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
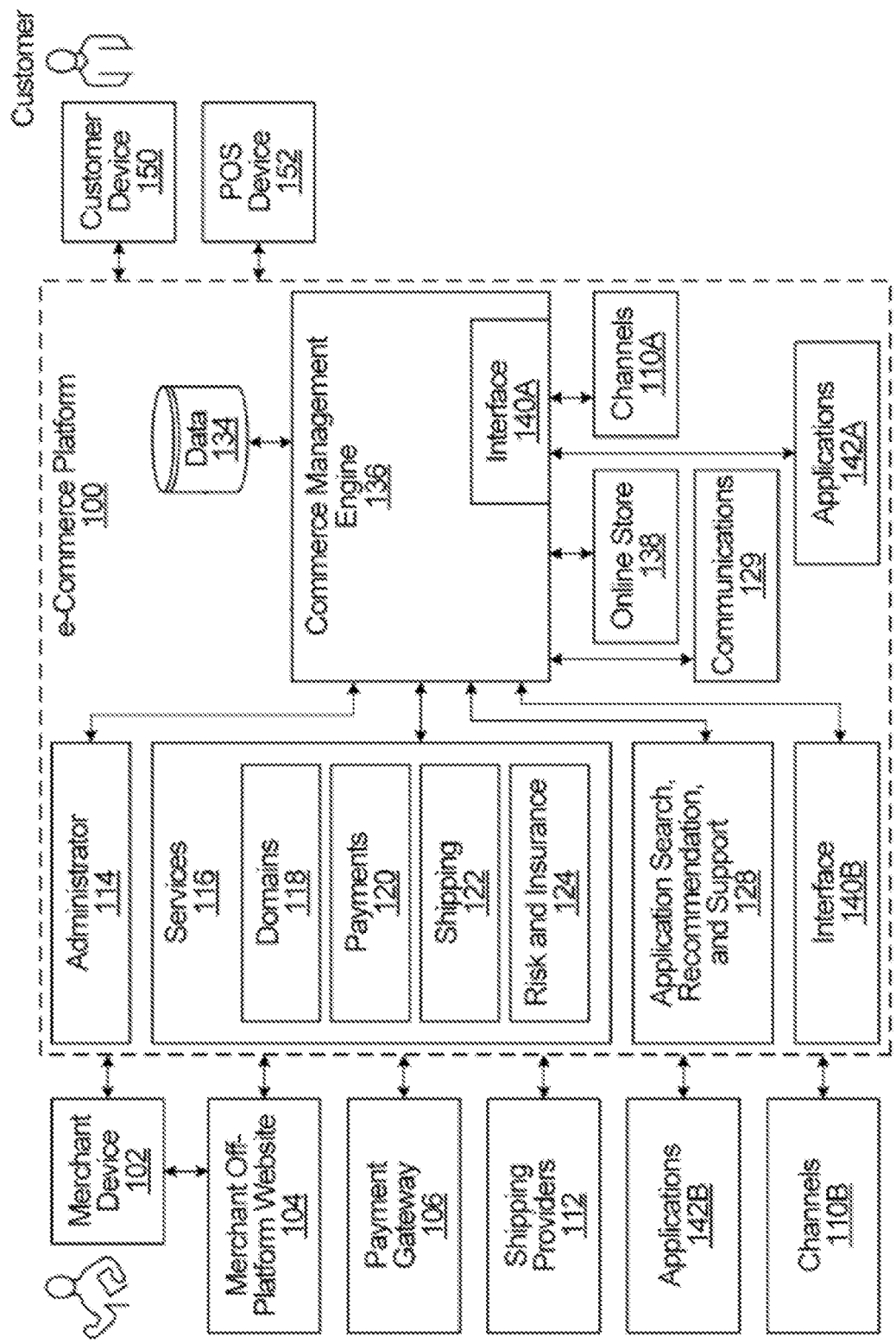
FIG. 7 illustrates an example e-commerce platform, according to one embodiment of the present disclosure.

FIG. 7 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
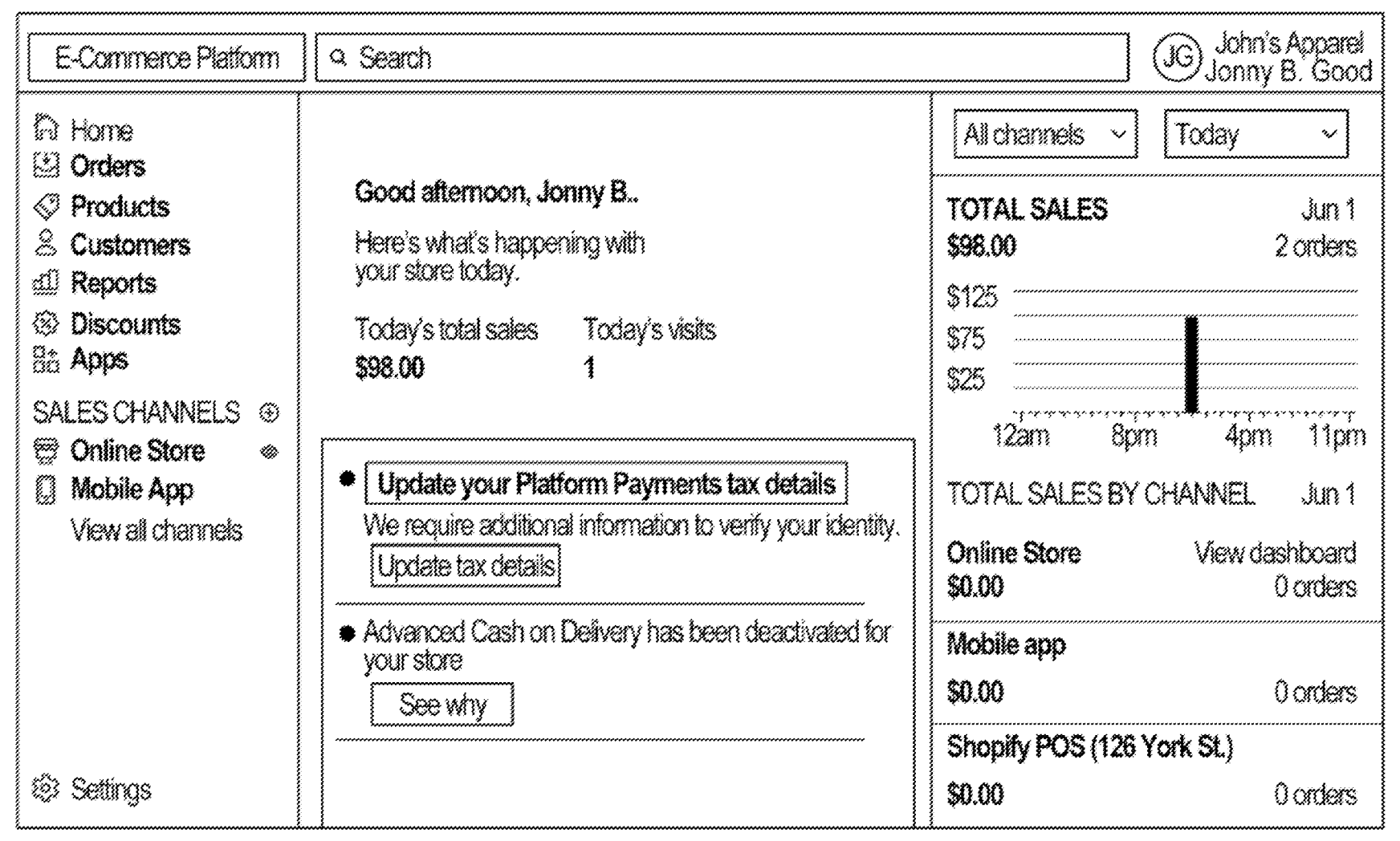

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports, and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation, and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

It should be noted that, in one example embodiment, the hosting platform 1002 corresponds to the e-commerce platform 100, the live view function 1010 may be implemented in the e-commerce platform 100, the user devices 1020 correspond to customer devices 150, the users 1018 correspond to the customers, the operator 1014 corresponds to the merchant, and the operator device 1016 corresponds to the merchant device 102.

Those skilled in the art will recognize improvements and modifications to the embodiments of the present disclosure. All such improvements and modifications are considered within the scope of the concepts disclosed herein.

The invention claimed is:

1. A computer-implemented method comprising:
generating a Graphical User Interface (GUI) representative of webpages of a website;
obtaining data indicative of user interactions with the webpages of the website; and
based on the data, dynamically updating one or more user interface elements within the GUI to represent presence of one or more users on the webpages within the website and one or more user interactions of the one or more users with the webpages of the website, wherein dynamically updating the one or more user interface elements with the GUI comprises:
dynamically updating one or more user interface elements associated to one or more respective users to reflect presence of the one or more respective users on particular categories of webpages within the website or on particular webpages within the website;
dynamically updating the one or more user interface elements associated to the one or more respective users to reflect one or more user interactions of the one or more respective users with the website; and
dynamically updating sizes of one or more user interface elements representative of one or more webpages within the website such that, for each webpage of the one or more webpages within the website, the size of the user interface element representative of the webpage is dynamically updated to reflect a number of users that are present on the webpage within the website.

2. The method of claim 1 wherein the website is an e-commerce store.

3. The method of claim 2 wherein the user interactions comprise: a user adding a product to the user's shopping cart, a user removing a product from the user's shopping cart, a user purchasing a product, or any combination thereof.

4. The method of claim 2 wherein the webpages of the website comprise a plurality of webpages for a respective plurality of products sold via the e-commerce store.

5. The method of claim 1 wherein the one or more user interface elements associated to the one or more respective users comprise one or more features representative of one or more attributes of the one or more respective users.

6. The method of claim 1 wherein dynamically updating the one or more user interface elements within the GUI further comprises dynamically updating sizes of one or more user interface elements representative of one or more categories of webpages within the website such that, for each category of webpages within the website from among the one or more categories, the size of the user interface element representative of the category of webpages is dynamically updated to reflect a number of users that are present on the category of webpages within the website.

7. The method of claim 1 wherein dynamically updating the one or more user interface elements within the GUI further comprises dynamically updating at least one of:
one or more user interface elements representative of one or more categories of webpages within the website to reflect one or more user interactions of one or more users that occur on the one or more categories of webpages within the website; or
the one or more user interface elements representative of the one or more webpages within the website to reflect one or more user interactions of one or more users that occur on the one or more webpages within the website.

8. The method of claim 1 wherein dynamically updating the one or more user interface elements associated to the one or more respective users to reflect the one or more user interactions of the one or more respective users with the website comprises, for a particular user interface element associated to a particular user, applying a particular motion or a particular animation to the particular user interface element to reflect occurrence of a particular user interaction.

9. The method of claim 1 further comprising:
receiving, from an operator via an associated operator device, a request for a new view of the website; and
updating the GUI to present the new view of the website in response to receiving the request.

10. The method of claim 9 wherein the new view is a user-specific view in which the GUI presents one or more user interface elements that represent a path of a select user to and through the website.

11. The method of claim 10 wherein the website is an e-commerce store and the webpages of the website comprise a plurality of webpages for a respective plurality of products sold via the e-commerce store.

12. The method of claim 1 wherein dynamically updating the one or more user interface elements within the GUI further comprises dynamically updating one or more user interface elements representative of a path over which a particular user has navigated through the website.

13. A computer system comprising:
a network interface; and
processing circuitry associated with the network interface, the processing circuitry configured to cause the computer system to:
  generate a Graphical User Interface (GUI) representative of webpages of a website;
  obtain data indicative of user interactions with the webpages of the website; and
  based on the data, dynamically update one or more user interface elements within the GUI to represent presence of one or more users on the webpages within the website and one or more user interactions of the one or more users with the webpages of the website, wherein, in order to dynamically update the one or more user interface elements with the GUI, the processing circuitry is further configured to cause the computer system to:
    dynamically update one or more user interface elements associated to one or more respective users to reflect presence of the one or more respective users on particular categories of webpages within the website or on particular webpages within the website;
    dynamically update the one or more user interface elements associated to the one or more respective users to reflect one or more user interactions of the one or more respective users with the website; and
    dynamically update sizes of one or more user interface elements representative of one or more webpages within the website such that, for each webpage of the one or more webpages within the website, the size of the user interface element representative of the webpage is dynamically updated to reflect a number of users that are present on the webpage within the website.

14. A non-transitory computer readable medium storing instructions executable by processing circuitry of a computer system whereby the computer system is caused to:
  generate a Graphical User Interface (GUI) representative of webpages of a website;
  obtain data indicative of user interactions with the webpages of the website; and
  based on the data, dynamically update one or more user interface elements within the GUI to represent presence of one or more users on the webpages within the website and one or more user interactions of the one or more users with the webpages of the website, wherein, in order to dynamically update the one or more user interface elements with the GUI, the processing circuitry is further caused to:
    dynamically update one or more user interface elements associated to one or more respective users to reflect presence of the one or more respective users on particular categories of webpages within the website or on particular webpages within the website;
    dynamically update the one or more user interface elements associated to the one or more respective users to reflect one or more user interactions of the one or more respective users with the website; and
    dynamically update sizes of one or more user interface elements representative of one or more webpages within the website such that, for each webpage of the one or more webpages within the website, the size of the user interface element representative of the webpage is dynamically updated to reflect a number of users that are present on the webpage within the website.

15. The non-transitory computer readable medium of claim 14 wherein the website is an e-commerce store.

16. The non-transitory computer readable medium of claim 14 wherein the one or more user interface elements associated to the one or more respective users comprise one or more features representative of one or more attributes of the one or more respective users.

17. The non-transitory computer readable medium of claim 14 wherein dynamically updating the one or more user interface elements within the GUI further comprises dynamically updating sizes of one or more user interface elements representative of one or more categories of webpages within the website such that, for each category of webpages within the website from among the one or more categories, the size of the user interface element representative of the category of webpages is dynamically updated to reflect a number of users that are present on the category of webpages within the website.

18. The non-transitory computer readable medium of claim 14 wherein dynamically updating the one or more user interface elements within the GUI further comprises dynamically updating at least one of:
  one or more user interface elements representative of one or more categories of webpages within the website to reflect one or more user interactions of one or more users that occur on the one or more categories of webpages within the website; or
  the one or more user interface elements representative of the one or more webpages within the website to reflect one or more user interactions of one or more users that occur on the one or more webpages within the website.

19. The non-transitory computer readable medium of claim 14 wherein dynamically updating the one or more user interface elements associated to the one or more respective users to reflect the one or more user interactions of the one or more respective users with the website comprises, for a particular user interface element associated to a particular user, applying a particular motion or a particular animation to the particular user interface element to reflect occurrence of a particular user interaction.

20. The non-transitory computer readable medium of claim 14 wherein dynamically updating the one or more user interface elements within the GUI further comprises dynamically updating one or more user interface elements representative of a path over which a particular user has navigated through the website.

* * * * *